(12) United States Patent
Aksan et al.

(10) Patent No.: US 11,383,912 B2
(45) Date of Patent: Jul. 12, 2022

(54) ADJUSTABLE INSULATION PACKAGING

(71) Applicant: Pratt Corrugated Holdings, Inc., Brookhaven, GA (US)

(72) Inventors: Yavuz Aksan, Suwanee, GA (US); Joshua David Kayne, Peachtree City, GA (US)

(73) Assignee: Pratt Corrugated Holdings, Inc., Brookhaven, GA (US)

( * ) Notice: Subject to any disclaimer, the term of this patent is extended or adjusted under 35 U.S.C. 154(b) by 0 days.

(21) Appl. No.: 16/293,868

(22) Filed: Mar. 6, 2019

(65) Prior Publication Data
US 2019/0193917 A1 Jun. 27, 2019

Related U.S. Application Data

(63) Continuation of application No. 14/703,094, filed on May 4, 2015, now Pat. No. 10,266,332.

(51) Int. Cl.
*B65D 81/38* (2006.01)

(52) U.S. Cl.
CPC ............... *B65D 81/3862* (2013.01)

(58) Field of Classification Search
CPC . B65D 81/3888; B65D 81/3862; F25D 23/06; F25D 23/067; F25D 23/069; F25D 5/02; F25D 3/14; F25D 2323/061; F25D 2201/12
USPC ................................... 220/592.26
See application file for complete search history.

(56) References Cited

U.S. PATENT DOCUMENTS

| | | | | |
|---|---|---|---|---|
| 265,985 | A | * 10/1882 | Seabury | B65D 5/4287 229/125.01 |
| 1,701,323 | A | * 2/1929 | Fredenhagen | F25D 3/00 220/592.09 |
| 1,868,996 | A | 7/1932 | Sharp | |
| 2,053,857 | A | 9/1936 | Weiss | |
| 2,151,733 | A | 3/1939 | Bonfield | |
| 2,386,905 | A | * 10/1945 | Meltzen | B65D 5/247 229/189 |

(Continued)

FOREIGN PATENT DOCUMENTS

| EP | 2990196 | 3/2016 |
| FR | 3008685 | 7/2013 |

(Continued)

OTHER PUBLICATIONS

US 8,845,046 B2, 09/2014, Nomura et al. (withdrawn)
(Continued)

*Primary Examiner* — Ernesto A Grano
(74) *Attorney, Agent, or Firm* — Taylor English Duma LLP (57) ABSTRACT

An insulation liner includes an outer film; and an insulation material encapsulated within the outer film. An insulation packaging assembly includes a box defining a box cavity; a first insulation liner positioned within the box cavity, the first insulation liner defining a C-shape, the first insulation liner including an outer film and an insulation material encapsulated within the outer film; and a second insulation liner positioned within the box cavity, the second insulation liner defining the C-shape, the second insulation liner fitting together with the first insulation liner to define a storage cavity enclosed by the first insulation liner and the second insulation liner.

18 Claims, 5 Drawing Sheets

(56) References Cited

U.S. PATENT DOCUMENTS

| | | | | |
|---|---|---|---|---|
| 2,389,601 A | * | 11/1945 | De Witt | B65D 11/10 220/604 |
| 2,554,004 A | | 5/1951 | Bergstein | |
| 2,899,103 A | * | 8/1959 | Ebert | A01K 97/04 220/754 |
| 2,927,720 A | | 3/1960 | Adams | |
| 2,934,251 A | | 4/1960 | Kramer | |
| 2,969,164 A | * | 1/1961 | Morrison | B65D 90/06 220/592.2 |
| 3,096,879 A | * | 7/1963 | Schumacher | B65D 81/1275 206/523 |
| 3,097,782 A | * | 7/1963 | Koropatkin | A45C 9/00 229/103 |
| 3,182,913 A | * | 5/1965 | Brian | B65D 5/247 229/117.13 |
| 3,194,480 A | | 7/1965 | Maindron et al. | |
| 3,222,843 A | | 12/1965 | Schneider | |
| 3,420,363 A | | 1/1969 | Blickensderfer | |
| 3,552,466 A | * | 1/1971 | Fairchilds | B65D 37/00 206/386 |
| 3,734,336 A | * | 5/1973 | Rankow | B65D 25/287 220/516 |
| 3,854,650 A | | 12/1974 | Hanaue | |
| 4,030,227 A | * | 6/1977 | Oftedahl | A01K 97/05 43/56 |
| 4,049,188 A | | 9/1977 | Persson | |
| 4,068,779 A | * | 1/1978 | Canfield | B65D 25/28 16/428 |
| 4,091,852 A | * | 5/1978 | Jordan | A45C 7/004 206/522 |
| 4,194,679 A | | 3/1980 | Lohrbach et al. | |
| 4,291,827 A | | 9/1981 | Mulroy | |
| 4,294,079 A | | 10/1981 | Benson | |
| 4,319,710 A | | 3/1982 | Osborne | |
| 4,392,607 A | | 7/1983 | Perkins, Jr. | |
| 4,399,157 A | | 8/1983 | Caporaso | |
| 4,418,864 A | | 12/1983 | Neilsen | |
| 4,434,890 A | | 3/1984 | Sieck et al. | |
| 4,444,821 A | * | 4/1984 | Young | B29C 70/00 428/69 |
| 4,488,623 A | * | 12/1984 | Linnell, II | A45C 9/00 190/115 |
| 4,509,645 A | * | 4/1985 | Hotta | A45C 11/20 206/545 |
| 4,583,678 A | | 4/1986 | Weimer, Jr. | |
| 4,650,112 A | | 3/1987 | Booth | |
| 4,821,949 A | | 4/1989 | Booth | |
| 4,884,741 A | | 12/1989 | Nederveld | |
| 4,953,782 A | | 9/1990 | Noland | |
| 5,016,813 A | * | 5/1991 | Simons | B65D 5/4287 229/189 |
| 5,022,582 A | | 6/1991 | Ritter | |
| 5,046,662 A | | 9/1991 | Cowles | |
| 5,062,527 A | * | 11/1991 | Westerman | B65D 5/3678 229/117 |
| 5,104,035 A | | 4/1992 | Rosenbaum, II | |
| 5,139,196 A | | 8/1992 | Fry et al. | |
| 5,154,309 A | * | 10/1992 | Wischusen, III | B65D 81/3858 229/103.11 |
| 5,165,583 A | * | 11/1992 | Kouwenberg | A45C 11/20 206/428 |
| 5,263,339 A | * | 11/1993 | Evans | B65D 5/46112 229/104 |
| 5,289,970 A | | 3/1994 | McClure | |
| 5,289,971 A | | 3/1994 | McClure | |
| 5,418,031 A | | 5/1995 | English | |
| 5,441,170 A | | 8/1995 | Bane, III | |
| 5,493,874 A | * | 2/1996 | Landgrebe | A47J 47/14 62/263 |
| 5,499,473 A | * | 3/1996 | Ramberg | A01K 97/05 43/55 |
| 5,596,880 A | * | 1/1997 | Welker | F25D 3/06 40/606.03 |
| 5,683,799 A | * | 11/1997 | Olinger | E04B 1/80 428/313.9 |
| 5,996,366 A | * | 12/1999 | Renard | A47F 3/04 62/256 |
| 6,003,719 A | * | 12/1999 | Stewart, III | B65D 81/3825 220/592.11 |
| 6,135,347 A | | 10/2000 | Mueller | |
| 6,164,526 A | * | 12/2000 | Dalvey | B65D 5/0005 206/427 |
| 6,168,040 B1 | * | 1/2001 | Sautner | F16L 59/065 220/592.1 |
| 6,220,473 B1 | * | 4/2001 | Lehman | B65D 81/3858 150/901 |
| 6,238,091 B1 | * | 5/2001 | Mogil | A45C 7/0077 383/110 |
| 6,244,458 B1 | * | 6/2001 | Frysinger | B65D 81/3823 220/592.09 |
| 6,247,328 B1 | * | 6/2001 | Mogil | A45C 7/0077 383/110 |
| 6,325,281 B1 | | 12/2001 | Grogan | |
| 6,325,282 B1 | | 12/2001 | Kanter et al. | |
| 6,343,696 B1 | | 2/2002 | McCormick et al. | |
| 6,378,733 B1 | | 4/2002 | Boonzaier | |
| 6,453,682 B1 | * | 9/2002 | Jennings | A47F 3/0439 62/246 |
| 6,478,268 B1 | * | 11/2002 | Bidwell | A47F 5/112 248/152 |
| 6,510,705 B1 | * | 1/2003 | Jackson | A01M 31/00 62/457.1 |
| 6,582,124 B2 | * | 6/2003 | Mogil | A45C 7/0077 383/110 |
| 6,618,868 B2 | * | 9/2003 | Minnick | E04H 4/08 4/498 |
| 6,688,133 B1 | * | 2/2004 | Donefrio | F25D 3/08 62/372 |
| 6,725,783 B2 | * | 4/2004 | Sekino | B65D 19/44 108/55.3 |
| 6,736,309 B1 | * | 5/2004 | Westerman | B65D 5/2057 229/117.05 |
| 6,771,183 B2 | * | 8/2004 | Hunter | B65D 81/3823 220/592.25 |
| 6,821,019 B2 | * | 11/2004 | Mogil | A45C 7/0077 206/545 |
| 6,837,420 B2 | | 1/2005 | Westerman et al. | |
| 6,868,982 B2 | | 3/2005 | Gordon | |
| 6,875,486 B2 | | 4/2005 | Miller | |
| 6,899,229 B2 | * | 5/2005 | Dennison | B65D 5/5028 206/583 |
| 6,910,582 B2 | | 6/2005 | Lantz | |
| 6,971,539 B1 | * | 12/2005 | Abbe | B65D 25/205 220/592.12 |
| 7,000,962 B2 | * | 2/2006 | Le | B65D 5/46032 220/757 |
| 7,083,147 B2 | | 8/2006 | Movsesian et al. | |
| 7,094,192 B2 | | 8/2006 | Schoenberger et al. | |
| 7,225,970 B2 | * | 6/2007 | Philips | B65D 5/247 229/171 |
| 7,229,677 B2 | | 6/2007 | Miller | |
| D552,988 S | | 10/2007 | Kisch | |
| 7,392,931 B2 | * | 7/2008 | Issler | B65D 5/20 229/125.08 |
| 7,422,143 B2 | | 9/2008 | Mayer | |
| 7,452,316 B2 | | 11/2008 | Cals et al. | |
| D582,676 S | * | 12/2008 | Rothschild | D3/276 |
| 7,500,593 B2 | | 3/2009 | Mayer | |
| 7,597,209 B2 | * | 10/2009 | Rothschild | A45C 7/0036 220/23.87 |
| 7,624,911 B2 | | 12/2009 | Spurrell et al. | |
| 7,635,080 B2 | | 12/2009 | Conway | |
| D608,634 S | | 1/2010 | Riedi | |
| 7,677,406 B2 | * | 3/2010 | Maxson | B65D 81/3823 220/254.3 |
| 7,681,405 B2 | | 3/2010 | Williams | |
| D614,928 S | | 5/2010 | Forsythe | |
| 7,807,773 B2 | * | 10/2010 | Matsuoka | C08L 67/04 528/272 |
| 7,841,512 B2 | | 11/2010 | Westerman et al. | |

(56) References Cited

U.S. PATENT DOCUMENTS

| | | | |
|---|---|---|---|
| 7,845,508 B2* | 12/2010 | Rothschild | A45C 7/0054 |
| | | | 220/7 |
| 7,870,992 B2 | 1/2011 | Schille et al. | |
| D642,129 S | 7/2011 | Ohkuma | |
| D651,076 S | 12/2011 | Van Berlo | |
| 8,101,259 B2 | 1/2012 | Kuboniwa | |
| 8,250,882 B2 | 8/2012 | Mustafa et al. | |
| 8,365,943 B2 | 2/2013 | Bentley | |
| 8,424,335 B2 | 4/2013 | Corder et al. | |
| 8,453,477 B2 | 6/2013 | Crespo et al. | |
| 8,613,202 B2 | 12/2013 | Williams | |
| 8,728,605 B2 | 5/2014 | Payne et al. | |
| 8,763,423 B2 | 7/2014 | Tattam | |
| 8,763,811 B2 | 7/2014 | Lantz | |
| 8,763,886 B2 | 7/2014 | Hall | |
| 8,887,515 B2 | 11/2014 | Patstone | |
| 8,919,082 B1 | 12/2014 | Cataldo | |
| 8,938,986 B2 | 1/2015 | Matta et al. | |
| 9,242,758 B2 | 1/2016 | Brundage et al. | |
| 9,540,132 B1 | 1/2017 | Lee | |
| 9,550,618 B1 | 1/2017 | Jobe | |
| 9,566,756 B2 | 2/2017 | Brundage | |
| 9,605,382 B2 | 3/2017 | Virtanen | |
| 9,751,683 B1 | 9/2017 | Jobe | |
| 9,981,797 B2* | 5/2018 | Aksan | B65D 77/042 |
| 10,065,782 B1 | 9/2018 | Jones et al. | |
| 10,065,786 B2* | 9/2018 | Kuhn | B65D 81/3813 |
| 10,106,290 B2 | 10/2018 | Couture | |
| D834,411 S | 11/2018 | Vanderhulst et al. | |
| 10,266,332 B2* | 4/2019 | Aksan | B65D 81/3862 |
| 10,472,122 B2 | 11/2019 | Aguirre | |
| D874,268 S | 2/2020 | Muse et al. | |
| 10,549,875 B2 | 2/2020 | Spivey, Sr. et al. | |
| 10,633,165 B2 | 4/2020 | Aksan et al. | |
| 10,752,425 B2 | 8/2020 | Aksan et al. | |
| 10,807,761 B2 | 10/2020 | Muse et al. | |
| 10,875,698 B2 | 12/2020 | Aksan et al. | |
| D919,432 S | 5/2021 | Muse et al. | |
| 2002/0050147 A1 | 5/2002 | Mai et al. | |
| 2002/0096559 A1 | 7/2002 | Quaintance | |
| 2003/0145561 A1 | 8/2003 | Cals et al. | |
| 2004/0004111 A1 | 1/2004 | Cardinale | |
| 2004/0016212 A1 | 1/2004 | Miller | |
| 2004/0081727 A1 | 4/2004 | Kelly et al. | |
| 2004/0151851 A1 | 8/2004 | Miller | |
| 2004/0211825 A1 | 10/2004 | Champion et al. | |
| 2005/0006446 A1 | 1/2005 | Stafford, Jr. | |
| 2005/0159282 A1 | 7/2005 | Schoenberger et al. | |
| 2005/0163947 A1 | 7/2005 | Miller | |
| 2005/0178142 A1 | 8/2005 | Perry et al. | |
| 2005/0224501 A1 | 10/2005 | Folkert et al. | |
| 2005/0241978 A1 | 11/2005 | Plue et al. | |
| 2006/0003057 A1 | 1/2006 | Kelly et al. | |
| 2006/0053828 A1* | 3/2006 | Shallman | F25D 3/14 |
| | | | 62/457.9 |
| 2006/0163333 A1 | 7/2006 | Kornacki | |
| 2006/0174648 A1 | 8/2006 | Lantz | |
| 2007/0051782 A1 | 3/2007 | Lantz | |
| 2007/0051783 A1 | 3/2007 | Wisecarver | |
| 2007/0131746 A1 | 6/2007 | Quaintance et al. | |
| 2007/0152027 A1 | 7/2007 | Hyatt et al. | |
| 2008/0078819 A1 | 4/2008 | Strong et al. | |
| 2008/0095959 A1 | 4/2008 | Warner et al. | |
| 2008/0099492 A1 | 5/2008 | Mayer | |
| 2008/0289302 A1 | 11/2008 | Vulpitta | |
| 2008/0296356 A1 | 12/2008 | Hatcher et al. | |
| 2009/0078699 A1 | 3/2009 | Mustafa et al. | |
| 2009/0078708 A1 | 3/2009 | Williams | |
| 2009/0193765 A1 | 8/2009 | Lantz | |
| 2009/0283578 A1 | 11/2009 | Miller | |
| 2010/0072105 A1 | 3/2010 | Glaser et al. | |
| 2010/0139878 A1 | 6/2010 | Clemente | |
| 2010/0314397 A1 | 12/2010 | Williams et al. | |
| 2011/0042449 A1 | 2/2011 | Copenhaver et al. | |
| 2011/0100868 A1 | 5/2011 | Lantz | |
| 2011/0114513 A1 | 5/2011 | Miller | |
| 2011/0127272 A1 | 6/2011 | Crespo et al. | |
| 2011/0241514 A1 | 10/2011 | Nomura et al. | |
| 2011/0284556 A1 | 11/2011 | Palmer et al. | |
| 2011/0311758 A1 | 12/2011 | Burns et al. | |
| 2012/0046513 A1 | 2/2012 | O'Connell | |
| 2012/0145568 A1 | 6/2012 | Collison et al. | |
| 2012/0248101 A1 | 10/2012 | Tumber et al. | |
| 2012/0251818 A1 | 10/2012 | Axrup et al. | |
| 2013/0094791 A1 | 4/2013 | Aspenson et al. | |
| 2013/0055750 A1 | 5/2013 | Mustafa et al. | |
| 2013/0112694 A1 | 5/2013 | Bentley | |
| 2013/0112695 A1 | 5/2013 | Hall | |
| 2013/0140317 A1 | 6/2013 | Roskoss | |
| 2013/0291584 A1 | 11/2013 | Chapman, Jr. | |
| 2014/0000306 A1 | 1/2014 | Chapman, Jr. | |
| 2014/0021208 A1 | 1/2014 | Anti et al. | |
| 2014/0144161 A1 | 5/2014 | Pointer et al. | |
| 2014/0151382 A1 | 6/2014 | White et al. | |
| 2014/0319018 A1* | 10/2014 | Collison | B65D 81/127 |
| | | | 206/589 |
| 2014/0353317 A1 | 12/2014 | Ranade et al. | |
| 2014/0367393 A1 | 12/2014 | Ranade | |
| 2015/0068242 A1 | 3/2015 | Patstone | |
| 2016/0304267 A1 | 10/2016 | Aksan | |
| 2016/0325915 A1 | 11/2016 | Aksan | |
| 2017/0225870 A1 | 8/2017 | Collison | |
| 2018/0086539 A1 | 3/2018 | Aksan et al. | |
| 2018/0237207 A1 | 8/2018 | Aksan et al. | |
| 2019/0185248 A1 | 6/2019 | Aksan et al. | |
| 2019/0270539 A1 | 9/2019 | Muse et al. | |
| 2020/0270052 A1 | 8/2020 | Aksan et al. | |
| 2020/0407101 A1 | 12/2020 | Muse et al. | |
| 2021/0061542 A1 | 3/2021 | Aksan et al. | |

FOREIGN PATENT DOCUMENTS

| | | |
|---|---|---|
| GB | 1272730 | 5/1972 |
| JP | 2001018952 | 1/2001 |
| JP | 5661362 | 1/2015 |
| WO | 2016187435 A2 | 5/2016 |
| WO | 2016187435 A3 | 11/2016 |

OTHER PUBLICATIONS

Aksan, Yavuz; Final Office Action for U.S. Appl. No. 15/954,677, filed Apr. 17, 2018, dated Nov. 8, 2019, 23 pgs.

Aksan, Yavuz; Applicant-Initiated Interview Summary for U.S. Appl. No. 16/280,609, filed Feb. 20, 2019, dated Oct. 4, 2019, 3 pgs.

Aksan, Yavuz; Final Office Action for U.S. Appl. No. 16/280,609, filed Feb. 20, 2019, dated Sep. 10, 2019, 18 pgs.

Aksan, Yavuz; Non-Final Office Action for U.S. Appl. No. 16/280,609, filed Feb. 20, 2019, dated Nov. 19, 2019, 14 pgs.

Muse, John Richard; Final Office Action for U.S. Appl. No. 15/909,515, filed Mar. 1, 2018, dated Sep. 19, 2019, 16 pgs.

Muse, John Richard; Notice of Allowance for U.S. Appl. No. 29/646,433, filed May 4, 2018, dated Sep. 26, 2019, 14 pgs.

Aksan, Yavuz; Applicant-Initiated Interview Summary for U.S. Appl. No. 14/690,501, filed Apr. 20, 2015, dated Feb. 9, 2017, 7 pgs.

Aksan, Yavuz; Final Office Action for U.S. Appl. No. 14/690,501, filed Apr. 20, 2015, dated Dec. 8, 2016, 18 pgs.

Aksan, Yavuz; Issue Notification for U.S. Appl. No. 14/690,501, filed Apr. 20, 2015, dated May 9, 2018, 1 pg.

Aksan, Yavuz; Non-Final Office Action for U.S. Appl. No. 14/690,501, filed Apr. 20, 2015, dated Aug. 17, 2016, 22 pgs.

Aksan, Yavuz; Non-Final Office Action for U.S. Appl. No. 14/690,501, filed Apr. 20, 2015, dated Aug. 8, 2017, 18 pgs.

Aksan, Yavuz; Notice of Allowability for U.S. Appl. No. 14/690,501, filed Apr. 20, 2015, dated Mar. 28, 2018, 2 pgs.

Aksan, Yavuz; Notice of Allowability for U.S. Appl. No. 14/690,501, filed Apr. 20, 2015, dated Apr. 18, 2018, 6 pgs.

Aksan, Yavuz; Notice of Allowability for U.S. Appl. No. 14/690,501, filed Apr. 20, 2015, dated Apr. 26, 2018, 6 pgs.

Aksan, Yavuz; Notice of Allowance for U.S. Appl. No. 14/690,501, filed Apr. 20, 2015, filed Jan. 31, 2018, 14 pgs.

(56) References Cited

OTHER PUBLICATIONS

Aksan, Yavuz; Advisory Action for U.S. Appl. No. 14/703,094, filed May 4, 2015, dated Sep. 13, 2018, 3 pgs.
Aksan, Yavuz; Applicant-Initiated Interview Summary for U.S. Appl. No. 14/703,094, filed May 4, 2015, dated Jan. 16, 2019, 3 pgs.
Aksan, Yavuz; Final Office Action for U.S. Appl. No. 14/703,094, filed May 4, 2015, dated Jul. 10, 2018, 25 pgs.
Aksan, Yavuz; Issue Notification for U.S. Appl. No. 14/703,094, filed May 4, 2015, dated Apr. 3, 2019, 1 pg.
Aksan, Yavuz; Non-Final Office Action for U.S. Appl. No. 14/703,094, filed May 4, 2015, dated Oct. 30, 2018, 13 pgs.
Aksan, Yavuz; Non-Final Office Action for U.S. Appl. No. 14/703,904, filed May 4, 2015, dated Dec. 29, 2017, 39 pgs.
Aksan, Yavuz; Notice of Allowance for U.S. Appl. No. 14/703,094, filed May 4, 2015, dated Feb. 19, 2019, 13 pgs.
Aksan, Yavuz; Restriction Requirement for U.S. Appl. No. 14/703,904, filed May 4, 2015, dated Sep. 15, 2017, 7 pgs.
Muse, John Richard; Non-Final Office Action for U.S. Appl. No. 15/909,515, filed Mar. 1, 2018, dated Mar. 18, 2019, 34 pgs.
Muse, John Richard; Ex Parte Quayle Action for U.S. Appl. No. 29/646,433, filed May 4, 2018, mailed May 14, 2019, 32 pgs.
Greenblue; "Environmental Technical Briefs of Common Packaging Materials—Fiber-Based Materials", Sustainable Packaging Solution, 2009.
MP Global Products; Article entitled: "Thermopod mailer envelopes and Thermokeeper insulated box liners", located at <http://www.mhpn.com/product/thermopod_mailer_envelopes_and_thermokeeper_insulated_box_liners/packaging>, accessed on Aug. 30, 2017, 2 pgs.
UN Packaging; Article entitled: "CooLiner® Insulated Shipping Bags", available at <http://www.chem-tran.com/packaging/supplies/cooliner-insulated-shipping-bags.php>, accessed on Aug. 30, 2017, 2 pgs.
Aksan, Yavuz; Non-Final Office Action for U.S. Appl. No. 15/954,677, filed Apr. 17, 2018, dated Jun. 13, 2019, 45 pgs.
Aksan, Yavuz; Non-Final Office Action for U.S. Appl. No. 16/280,609, filed Feb. 20, 2019, dated Jun. 13, 2019, 28 pgs.
Aksan, Yavuz; Non-Final Office Action for U.S. Appl. No. 15/809,072, filed Nov. 10, 2017, dated Aug. 6, 2019, 47 pgs.
Aksan, Yavuz; Final Office Action for U.S. Appl. No. 15/809,072, filed Nov. 10, 2017, dated Jan. 31, 2020, 22 pgs.
Muse, John Richard; Advisory Action for U.S. Appl. No. 15/909,515, filed Mar. 1, 2018, dated Nov. 20, 2019, 3 pgs.
Muse, John Richard; Non-Final Office Action for U.S. Appl. No. 15/909,515, filed Mar. 1, 2018, dated Jan. 3, 2020, 11 pgs.
Muse, John Richard; Corrected Notice of Allowance for U.S. Appl. No. 29/646,433, filed May 4, 2018, dated Dec. 9, 2019, 7 pgs.
Aksan, Yavuz; Notice of Allowance for U.S. Appl. No. 15/954,677, filed Apr. 17, 2018, dated Mar. 31, 2020, 20 pgs.
Aksan, Yavuz; Notice of Allowance for U.S. Appl. No. 16/280,609, filed Feb. 20, 2019, dated Mar. 13, 2020, 18 pgs.
Aksan, Yavuz; Non-Final Office Action for U.S. Appl. No. 15/809,072, filed Nov. 10, 2017, dated Apr. 22, 2020, 25 pgs.
Muse, John Richard; Applicant-Initiated Interview Summary for U.S. Appl. No. 15/909,515, filed Mar. 1, 2018, dated Mar. 26, 2020, 3 pgs.
Muse, John Richard; Non-Final Office Action for U.S. Appl. No. 15/909,515, filed Mar. 1, 2018, dated Jan. 30, 2020, 16 pgs.
Aksan, Yavuz; Notice of Allowance for U.S. Appl. No. 15/954,677, filed Apr. 17, 2018, dated Jul. 23, 2020, 6 pgs.
Aksan, Yavuz; Supplemental Notice of Allowance for U.S. Appl. No. 15/954,677, filed Apr. 17, 2018, dated Jun. 12, 2020, 6 pgs.
Muse, John Richard; Notice of Allowance for U.S. Appl. No. 15/909,515, filed Mar. 1, 2018, dated Jun. 17, 2020, 10 pgs.
Aksan, Yavuz; Notice of Allowance for U.S. Appl. No. 15/809,072, filed Nov. 10, 2017, dated Sep. 17, 2020, 19 pgs.
Muse, John Richard; Non-Final Office Action for Design U.S. Appl. No. 29/718,113, filed Dec. 20, 2019, dated Nov. 23, 2020, 39 pgs.
Muse, John Richard; Non-Final Office Action for U.S. Appl. No. 17/019,440, filed Sep. 14, 2020, dated Jul. 12, 2021, 43 pgs.
Muse, John Richard; Notice of Allowance for Design U.S. Appl. No. 29/718,113, filed Dec. 20, 2019, dated Mar. 8, 2021, 9 pgs.
Muse, John Richard; Supplemental Notice of Allowance for U.S. Design Application No. 29/718,113, filed Dec. 20, 2019, dated Mar. 18, 2021, 6 pgs.
Aksan, Yavuz; Non-Final Office Action for U.S. Appl. No. 15/931,671, filed May 14, 2020, dated Sep. 22, 2021, 55 pgs.
Aksan, Yavuz; Final Office Action for U.S. Appl. No. 15/931,671, filed May 14, 2020, dated Mar. 31, 2022, 20 pgs.
Aksan, Yavuz; Non-Final Office Action for U.S. Appl. No. 16/950,811, filed Nov. 17, 2020, dated Mar. 2, 2022 53 pgs.
Muse, John Richard; Final Office Action for U.S. Appl. No. 17/019,440, filed Sep. 14, 2020, dated Feb. 8, 2022, 17 pgs.
Muse, John Richard; Notice of Allowance for U.S. Appl. No. 17/019,440, filed Sep. 14, 2020, dated May 16, 2022, 5 pgs.

\* cited by examiner

ADJUSTABLE INSULATION PACKAGING

REFERENCE TO RELATED APPLICATION

This application is a continuation of U.S. application Ser. No. 14/703,094, filed May 4, 2015, which is hereby specifically incorporated by reference herein in its entirety.

TECHNICAL FIELD

This disclosure relates to packaging. More specifically, this disclosure relates to adjustable insulation packaging.

BACKGROUND

Packaging of perishable items, fragile items, pharmaceuticals, and various other items of various shapes and sizes poses a challenge to suppliers and consumers alike. For example, suppliers are faced with the challenge of shipping fragile items, perishable items, pharmaceuticals, and various other items economically while minimizing damage and other forms of transit breakage. Similar challenges exist for individual consumers shipping perishable items, fragile items, pharmaceuticals, and various other items.

SUMMARY

Disclosed is an insulation liner comprising an outer film; and an insulation material encapsulated within the outer film.

Also disclosed an insulation packaging assembly comprising a box defining a box cavity; a first insulation liner positioned within the box cavity, the first insulation liner defining a C-shape, the first insulation liner comprising an outer film and an insulation material encapsulated within the outer film; and a second insulation liner positioned within the box cavity, the second insulation liner defining the C-shape, the second insulation liner fitting together with the first insulation liner to define a storage cavity enclosed by the first insulation liner and the second insulation liner.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Disclosed is an adjustable insulation packaging assembly and associated methods, systems, devices, and various apparatus. The adjustable insulation packaging assembly includes a box, a first insulation liner, and a second insulation liner. It would be understood by one of skill in the art that the disclosed adjustable insulation packaging assembly is described in but a few exemplary embodiments among many. No particular terminology or description should be considered limiting on the disclosure or the scope of any claims issuing therefrom. Directional references such as "up," "down," "top," "left," "right," "front," "back," and "corners," among others are intended to refer to the orientation as shown and described in the figure (or figures) to which the components and directions are referencing.

Figure 1:
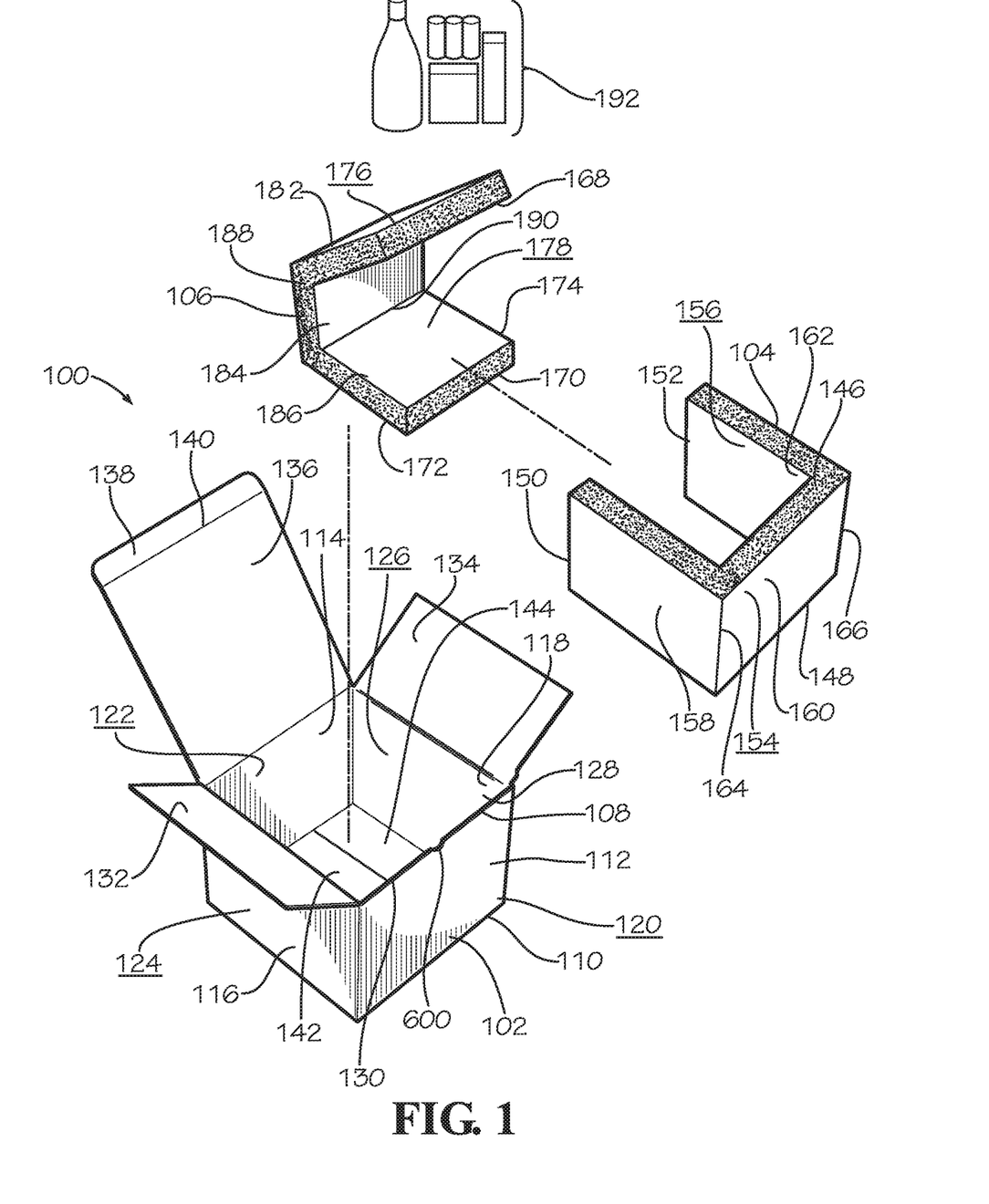
FIG. 1 is an exploded view of an adjustable insulation packaging assembly in accordance with one embodiment of the present disclosure including a box, a first insulation liner, and a second insulation liner.

One embodiment of an adjustable insulation packaging assembly 100 is disclosed and described in FIG. 1. The adjustable insulation packaging assembly 100 includes a box 102, a first insulation liner 104, and a second insulation liner 106.

Figure 6:
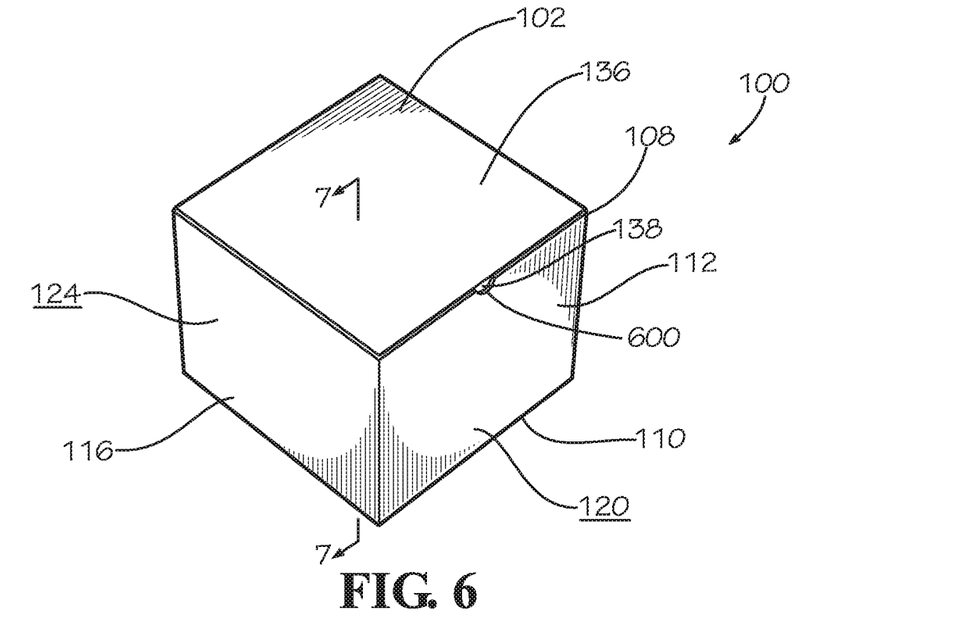
FIG. 6 is a perspective view of the adjustable insulation packaging assembly of FIG. 1 with the box closed.

The box 102 includes a top end 108, a bottom end 110, a front lateral side wall 112, a back lateral side wall 114, a left lateral side wall 116, and a right lateral side wall 118. The front lateral side wall 112 includes an inner surface 400 (shown in FIG. 4) and an outer surface 120. The back lateral side wall 114 includes an inner surface 122 and an outer surface 700 (shown in FIG. 7). The left lateral side wall 116 defines an inner surface 402 (shown in FIG. 4) and an outer surface 124. The right lateral side wall 118 defines an inner surface 126 and an outer surface 404 (shown in FIG. 4). The inner surfaces of the lateral side walls 112,114,116,118 define a box cavity 128. The lateral side walls 112,114,116, 118 define a top opening 130 at the top end 108 of the box 102. A distance from the top end 108 to the bottom end 110 defines a box height. In various embodiments, a notch 600 is defined in the front lateral side wall 112 at the top end 108 of the box 102.

As shown in FIG. 1, in the present embodiment, the box 102 includes a top left flap 132 connected to the left lateral side wall 116 at the top end 108 of the box 102 and a top right flap 134 connected to the right lateral side wall 118 at the top end 108 of the box 102. The box 102 also includes a back flap 136 connected to the back lateral side wall 114 at the top end 108 of the box 102. In various embodiments, the back flap 136 includes a locking panel 138 connected to the back flap 136 through a bend line 140. The flaps 132,134,136 may be used to close the top opening 130. When closed, the top left flap 132, top right flap 134, and back flap 136 define a top side wall of the box 102.

In various embodiments, the box 102 includes a bottom left flap 142 connected to the left lateral side wall 116 at the bottom end 110 of the box 102 and a bottom right flap 144 connected to the right lateral side wall 118 at the bottom end 110 of the box 102. When closed, the bottom flaps 142,144 define a bottom side wall of the box 102. In addition, the location, number, and shape of the flaps on the box 102 should not be considered limiting on the current disclosure. For example, in various other embodiments, each of the lateral side walls 112,114,116,118 includes a flap at the top end 108 of the box 102. In various embodiments, the box 102 also includes bottom flaps at each lateral side wall 112,114,116,118 at the bottom end 110. In various embodiments, any of the flaps on the box 102 may be integral with the box 102 or connected to the box 102. In various embodiments, any of the flaps of the box 102 may include connecting mechanisms such as slats, snaps, adhesive, hooks and loops, and any other connecting mechanisms for selectively holding the flaps in place to form the respective top side wall and bottom side wall of the box 102.

In addition, the number of side walls of the box 102 should not be considered limiting on the current disclosure. In various embodiments, the box 102 includes the top side wall, for example as formed by the top left flap 132, top right flap 134, and back flap 136, the bottom side wall, for example as formed by the bottom right flap 144 and the bottom left flap 142, and at least one lateral side wall, such as the back lateral side wall 114. For example, in various embodiments, the box 102 may be a cylindrically shaped box with a plurality of lateral side walls curved into a cylindrical shape, where each side wall is a portion of the curved cylindrical perimeter of the box, such as where each side wall is a quarter portion of the perimeter, a half portion of the perimeter, or a third portion of the perimeter, or where one lateral side wall is a third portion of the perimeter and one lateral side wall is a two-thirds portion of the perimeter.

The adjustable insulation packaging assembly 100 also includes the first insulation liner 104 in various embodiments. In various embodiments, the first insulation liner 104 includes a top side end 146, a bottom side end 148, a left side end 150, and a right side end 152. As shown in FIG. 1, the first insulation liner 104 defines an outer surface 154 and an inner surface 156 between the ends 146,148,150,152. In various embodiments, the first insulation liner 104 includes a left fold 158 defined between the left side end 150 and a first bend line 164, a center fold 160 defined between the first bend line 164 and a second bend line 166, and a right fold 162 defined between the second bend line 166 and the right side end 152. In various embodiments, the left fold 158 is bendable relative to the center fold 160 at the first bend line 164 and the right fold 162 is bendable relative to the center fold 160 at the second bend line 166. In various other embodiments, the left fold 158 is bendable relative to the center fold 160 at locations other than the first bend line 164 on the first insulation liner 104 or the first bend line 164 may be provided at another location on the first insulation liner 104. In various other embodiments, the right fold 162 is bendable relative to the center fold 160 at locations other than the second bend line 166 on the first insulation liner 104 or the second bend line 166 may be provided at another location on the first insulation liner 104. The location of the bend lines 164,166 should not be considered limiting on the current disclosure as in various other embodiments, the location of the bend lines 164,166 may be varied to accommodate boxes with different dimensions.

The first insulation liner 104 is used to wrap items 192 positioned in the box 102 horizontally and contact the left lateral side wall 116, front lateral side wall 112, and right lateral side wall 118 of the box 102 in various embodiments. In various embodiments when the first insulation liner 104 is positioned in the box 102, the inner surface 156 faces the items 192 in the box cavity 128 of the box 102 and the outer surface 154 faces the left lateral side wall 116, front lateral side wall 112, and right lateral side wall 118 of the box 102. In various embodiments, the outer surface 154 may face any of the lateral side walls 112,114,116,118 as desired. In various embodiments, the outer surface 154 contacts at least one of the lateral side walls 112,114,116,118. A distance from the top side end 146 to the bottom side end 148 defines a height of the first insulation liner 104. In various embodiments, the dimensions of the left fold 158, center fold 160, and right fold 162 may be varied to accommodate various boxes 102 having various dimensions.

In various embodiments, the adjustable insulation packaging assembly 100 also includes the second insulation liner 106. In various embodiments, the second insulation liner 106 includes a top side end 168, a bottom side end 170, a left side end 172, and a right side end 174. As shown in FIG. 1, the second insulation liner 106 defines an outer surface 176 and an inner surface 178 between the ends 168,170,172,174. The second insulation liner 106 includes a top fold 182 defined between the top side end 168 and a third bend line 188, a back fold 184 defined between the third bend line 188 and a fourth bend line 190, and a bottom fold 186 defined between the fourth bend line 190 and the bottom side end 170 in various embodiments. In various embodiments, the top fold 182 is bendable relative to the back fold 184 at the third bend line 188 and the bottom fold 186 is bendable relative to the back fold 184 at the fourth bend line 190. In various other embodiments, the top fold 182 is bendable relative to the back fold 184 at locations other than the third bend line 188 on the second insulation liner 106 or the third bend line 188 may be provided at another location on the second insulation liner 106. In various other embodiments, the bottom fold 186 is bendable relative to the back fold 184 at locations other than the fourth bend line 190 on the second insulation liner 106 or the fourth bend line 190 may be provided at another location on the second insulation liner 106. The location of the bend lines 188,190 should not be considered limiting on the current disclosure as in various other embodiments, the location of the bend lines 188,190 may be varied to accommodate boxes with different dimensions.

The second insulation liner 106 is used to wrap the items 192 of the box 102 vertically and contact the bottom flaps 142,144 at the bottom end 110 forming the bottom side wall of the box 102, the back lateral side wall 114, and the flaps 132,134,136, at the top end 108 forming the top side wall of the box 102. In various embodiments, when the second insulation liner 106 is positioned in the box 102, the inner surface 178 faces the items 192 of the box 102 in the box cavity 128 and the outer surface 176 faces the bottom flaps 142,144 at the bottom end 110, the back lateral side wall 114, and the flaps 132,134,136 at the top end 108 of the box 102. In various other embodiments, the outer surface 176 may face any of the lateral side walls 112,114,116,118 as desired. In various embodiments, the outer surface 176 contacts at least one of the lateral side walls 112,114,116,118. A distance from the third bend line 188 to the fourth bend line 190 defines a height of the back fold 184. In various embodiments, the height of the back fold 184 is less than or equal to the height of the box 102. In various embodiments, the dimensions of the top fold 182, back fold 184, and bottom fold 186 may be varied to accommodate various boxes 102 having various dimensions. In various embodiments, as described in greater detail below, the top fold 182, back fold 184, and bottom fold 186 are adjustable to accommodate the items 192 to be shipped placed in the box cavity 128 of the box 102. In various embodiments, the height of the first insulation liner 104 is greater than or equal to the height of the back fold 184 of the second insulation liner 106.

As shown in FIG. 1, in various embodiments, the items 192 to be shipped may have various dimensions and characteristics. When placed in the box cavity 128 of the box 102, the items 192 may have various dimensions and characteristics and thereby create void spaces in the box cavity 128 when a volume less than the volume of the box cavity 128 is occupied by the items 192. Void spaces may be undesirable in various embodiments as the items 192 may move around within the void space during shipping and damage the items 192. The number, shape, or location of items 192 in the box cavity 128 should not be considered limiting on the current disclosure In various embodiments, an inner box may be positioned in the box cavity 128. In various embodiments, the inner box may contain an item or items to be shipped. In various embodiments, the inner box may include a divider positioned within the inner box such that the divider divides the inner box into an upper chamber and a lower chamber. In various embodiments, each of the upper chamber and the lower chamber may have a temperature profile. In various embodiments, the divider may include vent openings enabling fluid flow through the divider. In various embodiments, the divider regulates the fluid flow and helps regulate the temperature profile of each of the upper chamber and the lower chamber. In various other embodiments, the divider may be included in the box cavity 128 without the inner box and divide the box cavity 128 into a first chamber and a second chamber.

Figure 2:
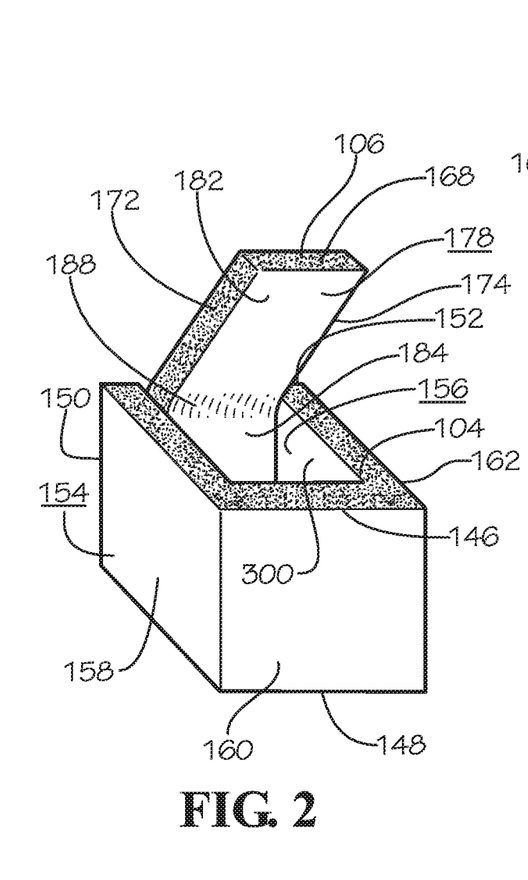
FIG. 2 is a perspective view of the first insulation liner and second insulation liner of FIG. 1 assembled.

FIG. 2 shows the first insulation liner 104 and second insulation liner 106 assembled. In various embodiments, the first insulation liner 104 and second insulation liner 106 assembled define a storage cavity 300. As shown in FIG. 2, in various embodiments, the first insulation liner 104 and second insulation liner 106 are assembled such that at least a portion of the inner surface 156 of the first insulation liner 104 contacts at least a portion of the left side end 172 and at least a portion of the right side end 174 of the second insulation liner 106. In various embodiments, at least a portion of the inner surface 156 of the first insulation liner 104 also contacts at least a portion of the bottom side end 170 of the second insulation liner 106.

In various embodiments when the first insulation liner 104 and second insulation liner 106 are assembled, the top fold 182 of the second insulation liner 106 forms the top side wall of the cavity 300, the back fold 184 of the second insulation liner 106 forms the back lateral side wall of the cavity 300, the bottom fold 186 of the second insulation liner 106 forms the bottom side wall of the cavity 300, the left fold 158 of the first insulation liner 104 forms the left lateral side wall of the cavity 300, the center fold 160 of the first insulation liner 104 forms the front lateral side wall of the cavity 300, and the right fold 162 of the first insulation liner 104 forms the right lateral side wall of the cavity 300. In various embodiments, the inner surface 178 of the second insulation liner 106 and the inner surface 156 of the first insulation liner 104 are the inner surfaces of the cavity 300.

In various embodiments, the second insulation liner 106 is assembled such that the back fold 184 is a lateral wall of the cavity 300. When the second insulation liner 106 is assembled, the bottom fold 186 is folded relative to the back fold 184 such that the bottom fold 186 is orthogonal to the back fold 184 in various embodiments. In various embodiments, the top fold 182 is folded relative to the back fold 184 such that at least a portion of the top fold 182 is orthogonal to the back fold 184.

In various embodiments, the first insulation liner 104 is assembled such that the left fold 158, center fold 160, and right fold 162 are lateral walls of the cavity 300. In various embodiments, when the first insulation liner 104 is assembled, the left fold 158 is folded relative to the center fold 160 such that the left fold 158 is orthogonal to the center fold 160. In various embodiments, the right fold 162 is folded relative to the center fold 160 such that the right fold 162 is orthogonal to the center fold 160.

When the liners 104,106 are assembled, the bottom side end 170 of the second insulation liner 106 contacts the inner surface 156 of the first insulation liner 104 at the center fold 160. In various embodiments, the bottom side end 170 contacts the inner surface 156 of the first insulation liner 104 adjacent to the bottom side end 148 of the first insulation liner 104 at the center fold 160.

In various embodiments, the left side end 172 of the second insulation liner 106 at the bottom fold 186 contacts the inner surface 156 of the first insulation liner 104 at the left fold 158. In various embodiments, the left side end 172 at the bottom fold 186 contacts the inner surface 156 of the first insulation liner 104 adjacent to the bottom side end 148 of the first insulation liner 104 at the left fold 158. When the liners 104,106 are assembled, in various embodiments, the right side end 174 of the second insulation liner 106 at the bottom fold 186 contacts the inner surface 156 of the first insulation liner 104 at the right fold 162. In various embodiments, the right side end 174 at the bottom fold 186 contacts the inner surface 156 of the first insulation liner 104 adjacent to the bottom side end 148 of the first insulation liner 104 at the right fold 162.

When the liners 104,106 are assembled, in various embodiments the left side end 172 of the second insulation liner 106 at the back fold 184 contacts the inner surface 156 of the first insulation liner 104 at the left fold 158. In various embodiments, the left side end 172 of the second insulation liner 106 at the back fold 184 contacts the inner surface 156 of the first insulation liner 104 adjacent to the left side end 150 on the left fold 158. In various embodiments, the right side end 174 of the second insulation liner 106 at the back fold 184 contacts the inner surface 156 of the first insulation liner 104 at the right fold 162. In various embodiments, the right side end 174 of the second insulation liner 106 at the back fold 184 contacts the inner surface 156 of the first insulation liner 104 adjacent to the right side end 152 on the right fold 162.

In various embodiments, the left side end 172 of the second insulation liner 106 at the top fold 182 contacts the inner surface 156 of the first insulation liner 104 at the left fold 158. In various embodiments, the left side end 172 at the top fold 182 contacts the inner surface 156 of the first insulation liner 104 adjacent to the top side end 146 of the first insulation liner 104 at the left fold 158. When the liners 104,106 are assembled, in various embodiments, the right side end 174 of the second insulation liner 106 at the top fold 182 contacts the inner surface 156 of the first insulation liner 104 at the right fold 162. In various embodiments, the right side end 174 at the top fold 182 contacts the inner surface 156 of the first insulation liner 104 adjacent to the top side end 146 of the first insulation liner 104 at the right fold 162.

In various embodiments, the top side end 168 of the second insulation liner 106 contacts the inner surface 156 of the first insulation liner 104 at the center fold 160. In various embodiments, the top side end 168 contacts the inner surface 156 of the first insulation liner 104 adjacent to the top side end 146 of the first insulation liner 104 at the center fold 160. In various other embodiments, as described in greater detail below with reference to FIG. 8, a portion of the inner surface 178 of the second insulation liner 106 contacts the inner surface 156 of the first insulation liner 104 at the center fold 160. In these embodiments, the top side end 168 of the second insulation liner 106 may be parallel with the top side end 146 of the first insulation liner 104.

In various embodiments, the first insulation liner 104 and the second insulation liner 106 are C-shaped when folded. In various embodiments, the first insulation liner 104 is C-shaped by folding the left fold 158 and the right fold 162 in the same direction relative to the center fold 160. In various embodiments, the second insulation liner 106 is C-shaped by folding the top fold 182 and the bottom fold 186 in the same direction relative to the back fold 184. However, the shape of the folded insulation liners 104,106 should not be considered limiting on the current disclosure as in various other embodiments, the folded insulation liners 104,106 may have any desired shape.

In various embodiments, the first insulation liner 104 and the second insulation liner 106 provide both cushioning and climate control to provide cushioned protection for the contents of the box 102 and maintain a temperature within the box 102. In various embodiments, the insulation liners 104,106 may include materials including, but not limited to, polyester film, such as polyethylene terephthalate (PET) film, foams, pellets, fabrics, nonwovens, polyethylene, polyurethane, polypropylene, and various other materials that may contribute towards a cushioned and climate controlled protective layer in the adjustable insulation packaging assembly 100. In various embodiments, the insulation liners 104,106 are biodegradable. In various embodiments, the insulation liners 104,106 are compostable. In various embodiments, the insulation liners are R-4 poly-encapsulated insulation 100% recycled cotton liners. In various other embodiments, the insulation liners 104,106 may have various other R values or may have various other percentage values of recycled cotton or other materials. In various other embodiments, the insulation liners 104,106 are not poly-encapsulated.

Figure 3:
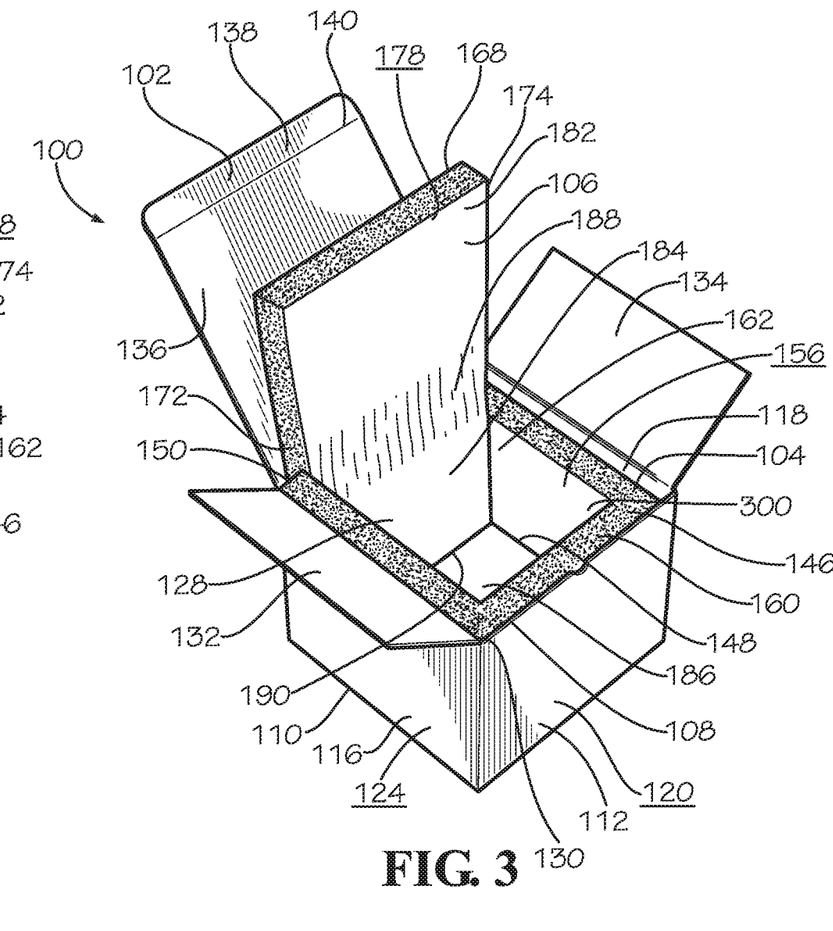
FIG. 3 is a perspective view of the first insulation liner, second insulation liner, and box of FIG. 1 with the first insulation liner and second insulation liner positioned in the box.

FIG. 3 shows the box 102 with the first insulation liner 104 and second insulation liner 106 positioned in the box cavity 128 of the box 102. As shown in FIG. 3, in various embodiments, the first insulation liner 104 and second insulation liner 106 are folded into the corners of the box 102 where the lateral side walls 112,114,116,118, top side wall, and bottom side wall respectively connect with each other. In various other embodiments, the first insulation liner 104 and second insulation liner 106 are folded but do not fill the corners. In these embodiments, a space may be defined between the respective corner of the box 102 and the outer surface 154 of the first insulation liner 104 or the outer surface 176 of the second insulation liner 106.

As shown in FIG. 3, in various embodiments, the first insulation liner 104 lines the left lateral side wall 116, front lateral side wall 112, and right lateral side wall 118. In various embodiments, at least a portion of the outer surface 154 of the first insulation liner 104 contacts the left lateral side wall 116, the front lateral side wall 112, and the right lateral side wall 118. In various embodiments, the left side end 150 and the right side end 152 contact the back lateral side wall 114. In various embodiments, the top side end 146 contacts the top side wall of the box 102 formed by the flaps 132,134,136 and the bottom side end 148 contacts the bottom side wall of the box 102 formed by the flaps 142,144. In various embodiments, the height of the first insulation liner 104 is less than the height of the box 102.

As shown in FIG. 3, in various embodiments, the second insulation liner 106 contacts the bottom side wall of the box 102 formed by the flaps 142,144, the back lateral side wall 114, and the top side wall of the box 102 formed by the flaps 132,134,136. In various embodiments, at least a portion of the outer surface 176 of the second insulation liner 106 contacts the bottom side wall of the box 102 formed by the flaps 142,144, the back lateral side wall 114, and the top side wall of the box 102 formed by the flaps 132,134,136.

In various embodiments, the first insulation liner 104 contacts at least a first of the lateral side walls 112,114,116, 118 and the second insulation liner 106 contacts at least a second of the lateral side walls 112,114,116,118. In various embodiments where the box 102 includes the top side wall, the bottom side wall, and a plurality of lateral side walls 112,114,116,118, the first insulation liner 104 contacts a first of the lateral side walls of the box 102 and the second insulation liner 106 contacts a second of the outer lateral side walls of the box 102.

In various embodiments, the first insulation liner 104 and second insulation liner 106 contacting the box 102 define a storage cavity 300. In various embodiments, the storage cavity 300 is cushioned through the first insulation liner 104 and second insulation liner 106. In various embodiments, the storage cavity 300 maintains a temperature profile within the box 102. In various embodiments, the storage cavity 300 is a portion of the box cavity 128 between the inner surfaces 178,156 of the first insulation liner 104 and second insulation liner 106 assembled together. A volume of the storage cavity 300 is adjustable to accommodate various sized items and to minimize void space in the storage cavity 300, as described in greater detail below.

Figure 4:
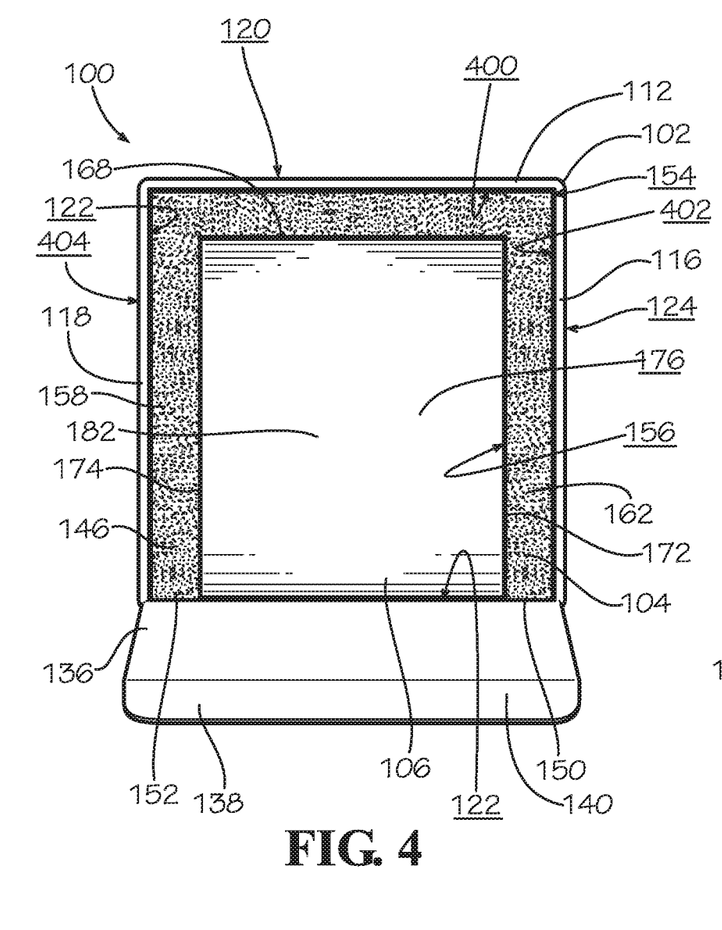
FIG. 4 is a top view of the first insulation liner, second insulation liner, and box of FIG. 1 with the first insulation liner and second insulation liner positioned in the box.

FIG. 4 shows a top view of the first insulation liner 104 and second insulation liner 106 positioned in the box 102. In various embodiments, the first insulation liner 104 and second insulation liner 106 fit tightly together such that no gaps or space are between the ends 168,170,172,174 of the second insulation liner 106 and the inner surface 156 of the first insulation liner 104. As shown in FIG. 4, the top fold 182 of the second insulation liner 106 is nested between the left fold 158, the right fold 162, and the center fold 160 of the first insulation liner 104. Although not shown, the bottom fold 186 of the second insulation liner 106 is also nested between the left fold 158, the right fold 162, and the center fold 160 of the first insulation liner 104. As shown in FIG. 4, the left side end 150 and right side end 152 of the first insulation liner 104 contact the inner surface 122 of the back lateral side wall 114 of the box 102 in various embodiments. In various embodiments, at least a portion of the outer surface 176 of the second insulation liner 106 contacts the inner surface 122 of the back lateral side wall 114. In various embodiments, at least a portion of the outer surface 154 of the first insulation liner 104 contacts the inner surface 400 of the front lateral side wall 112, the inner surface 402 of the left lateral side wall 116, and the inner surface 122 of the right lateral side wall 118. In the present embodiments, the outer surface 154 contacts each of the inner surface 400, the inner surface 402, and the inner surface 122.

Figure 5:
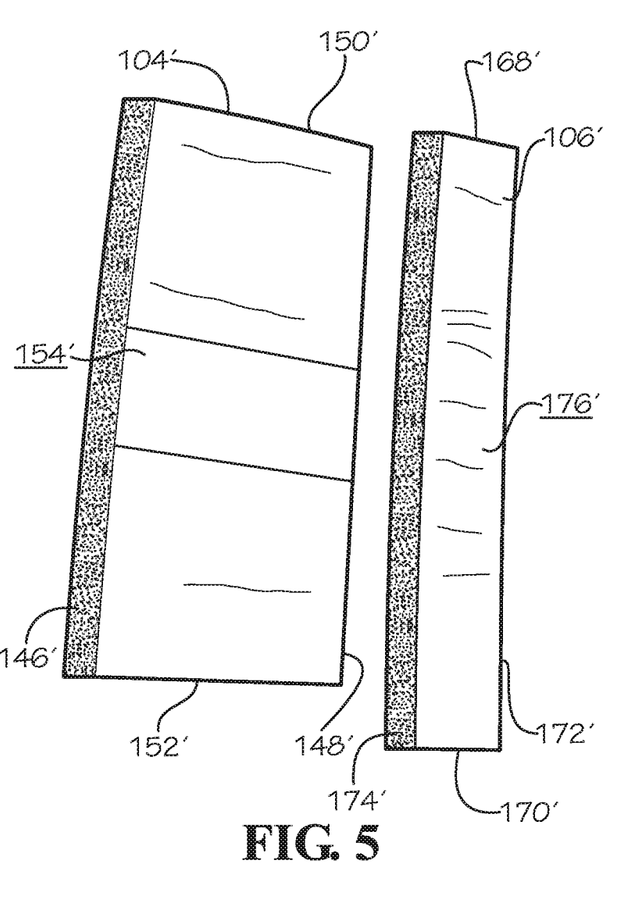
FIG. 5 is a perspective view of another embodiment of a first insulation liner and a second insulation liner.

FIG. 5 shows a perspective view of another embodiment of a first insulation liner 104' and a second insulation liner 106'. The first insulation liner 104' is similar to the first insulation liner 104 and includes a top side end 146', a bottom side end 148', a left side end 150', and a right side end 152'. As shown in FIG. 5, the first insulation liner 104' defines an outer surface 154' and an inner surface (not shown) between the ends 146',148',150',152'. The second insulation liner 106' is similar to the second insulation liner 106 and includes a top side end 168', a bottom side end 170', a left side end 172', and a right side end 174'. As shown in FIG. 5, the second insulation liner 106' defines an outer surface 176' and an inner surface (not shown) between the ends 168',170',172',174'. The shape and configuration shown in FIG. 5 should not be considered limiting on the current disclosure as in various other embodiments, the first insulation liner 104' and second insulation liner 106' may have any desired dimensions to accommodate a variety of different sized boxes.

FIG. 6 shows the adjustable insulation packaging assembly 100 in a fully closed position. When the adjustable insulation packaging assembly 100 is fully closed, the back flap 136 is folded to cover the top opening 130 of the box cavity 128. In various embodiments, the locking panel 138 is inserted into the box cavity 128 to help secure the back flap 136 closed. The adjustable insulation packaging assembly 100 may be self-sealing in various embodiments. In various other embodiments, the adjustable insulation packaging assembly 100 may utilize sealers such as various adhesives, glues, tapes, hook and loop connectors, and various other connecting mechanisms to maintain the fully closed position. As shown in FIG. 6, in various embodiments, the notch 600 is defined in the front lateral side wall 112 at the top end 108. In various embodiments, the notch 600 enables a user to access the locking panel 138. When closed, the volume of the storage cavity 300 is adjustable through folding of the second insulation liner 106 such that void space in the storage cavity 300 is minimized, as shown in FIGS. 7 and 8.

Figure 7:
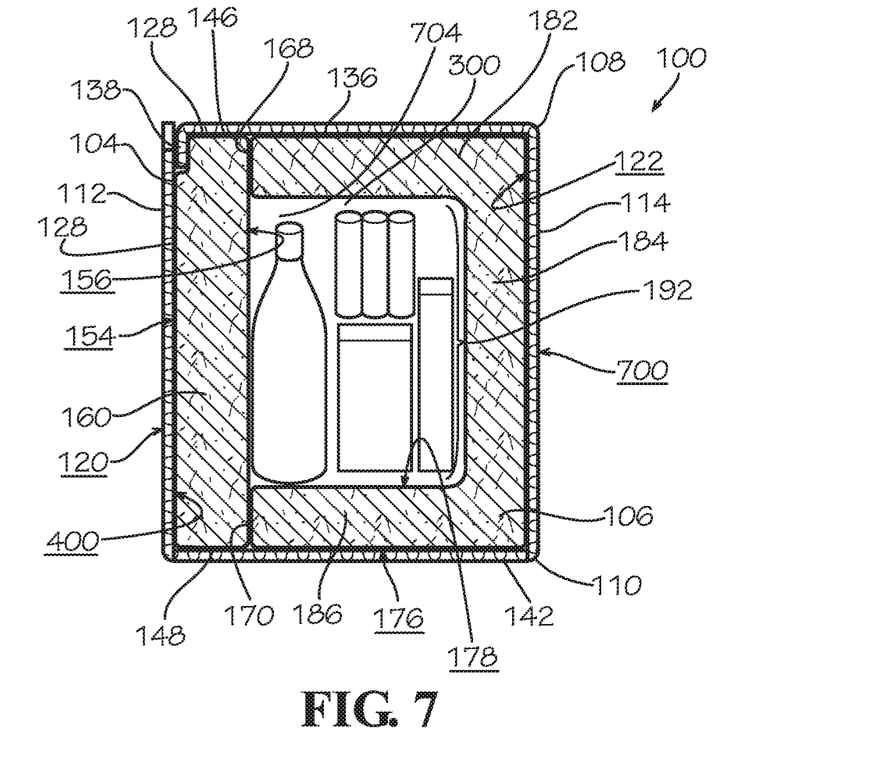
FIG. 7 is a sectional view of the adjustable insulation packaging assembly of FIG. 6 taken along line 7-7 in FIG. 6 with a first plurality of items to be shipped in a storage cavity of the adjustable insulation packaging assembly.
Figure 8:
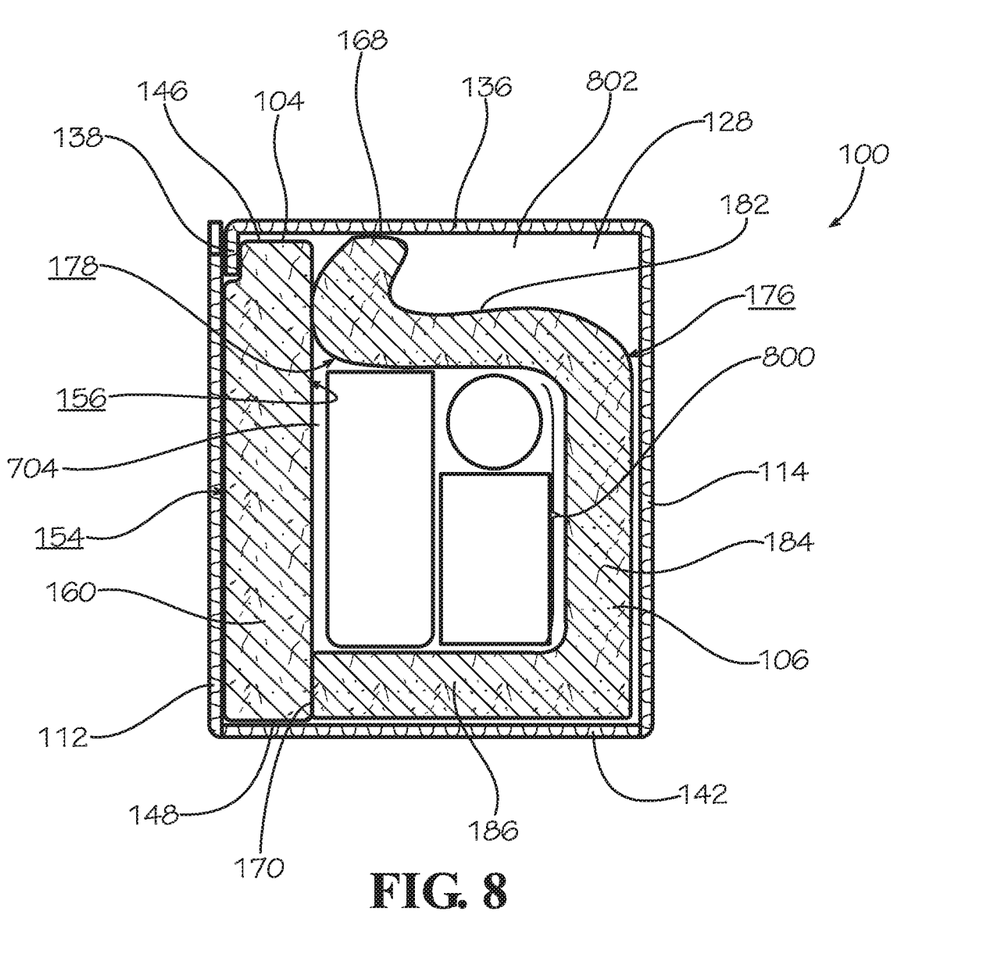
FIG. 8 is a sectional view of the adjustable insulation packaging assembly of FIG. 6 taken along line 7-7 in FIG. 6 with a second plurality of items to be shipped in a storage cavity of the adjustable insulation packaging assembly.

FIG. 7 shows a cross-sectional view of the adjustable insulation packaging assembly 100 taken along line 7-7 in FIG. 6 with items 192 positioned in the box cavity 128. In various embodiments, the items 192 are positioned in the storage cavity 300 on the bottom fold 186 of the second insulation liner 106. As shown in FIG. 7, the items 192 placed in the storage cavity 300 occupy a first volume of the box cavity 128. To minimize void space 704 in the storage cavity 300 between the items 192 and the top fold 182 of the second insulation liner 106, the top fold 182 is folded and the inner surface 178 of the second insulation liner 106 at the top fold 182 is positioned proximate to the items 192. In various embodiments, this minimizes a distance from the items 192 to the inner surface 178 of the second insulation liner 106 at the top fold 182. In various embodiments, the inner surface 178 of the second insulation liner 106 at the top fold 182 contacts the items 192. As shown in FIG. 7, in various embodiments when the inner surface 178 of the second insulation liner 106 at the top fold 182 is positioned proximate to the items 192, the outer surface 176 of the second insulation liner 106 contacts the top side wall of the box 102 formed at least partially by flap 136 and the top side end 168 contacts the inner surface 156 of the first insulation liner 104 at the center fold 160.

As is partially shown in FIG. 7, in the various embodiments, the second insulation liner 106 contacts the box 102 at the bottom side wall of the box 102 formed by flaps 142,144, the back lateral side wall 114, and the top side wall of the box 102 formed by flaps 132,134,136. As shown in FIG. 7, the outer surface 176 of the second insulation liner 106 at the bottom fold 186 contacts the bottom side wall of the box 102 formed at least partially by flap 142. In various embodiments, the outer surface 176 of the second insulation liner 106 at the back fold 184 contacts the inner surface 122 of the back lateral side wall 114 of the box 102. In various embodiments, the outer surface 176 of the second insulation liner 106 at the top fold 182 contacts the top side wall of the box 102 formed partially by the back flap 136. As shown in FIG. 7, in various embodiments, the top side end 168 and the bottom side end 170 of the second insulation liner 106 contact the inner surface 156 of the first insulation liner 104 at the center fold 160.

In various embodiments, the first insulation liner 104 contacts the box 102 at the left lateral side wall 116, front lateral side wall 112, and right lateral side wall 118. In various embodiments, the top side end 146 of the first insulation liner 104 contacts the top side wall of the box 102 formed at least partially by the back flap 136. In various embodiments, the bottom side end 148 of the first insulation liner 104 contacts the bottom side wall of the box 102 formed at least partially by flap 142. In various embodiments, the outer surface 154 of the first insulation liner 104 at the center fold 160 contacts the inner surface 400 of the front lateral side wall 112 of the box 102. As shown in FIG. 7, in various embodiments, the outer surface 154 of the first insulation liner 104 at the center fold 160 also contacts the locking panel 138. As shown in FIG. 4, in various embodiments, the outer surface 154 of the first insulation liner 104 at the left fold 158 contacts the inner surface 402 of the left lateral side wall 116 of the box 102 and the outer surface 154 of the first insulation liner 104 at the right fold 162 contacts the inner surface 122 of the right lateral side wall 118. In various other embodiments, the liners 104,106 may have any desired configuration such that together, the liners 104,106 contact the respective side walls of the box 102.

As shown in FIG. 7, when the adjustable insulation packaging assembly 100 is fully closed, the locking panel 138 connected to the back flap 136 is at least partially inserted into the box cavity 128 such that the locking panel 138 is adjacent to the front lateral side wall 112. In various embodiments, the locking panel 138 contacts the front lateral side wall 112. As shown in FIG. 7, in various embodiments, at least a portion of the outer surface 154 of the first insulation liner 104 contacts the inner surface 400 of the front lateral side wall 112. In various embodiments, the top side end 146 of the first insulation liner 104 contacts the top side wall of the box 102 formed at least partially by the back flap 136 and the bottom side end 148 of the first insulation liner 104 contacts the bottom side wall of the box 102 formed at least partially by flap 142.

FIG. 8 shows a cross-sectional view of the adjustable insulation packaging assembly 100 taken along line 7-7 in FIG. 6 with a second set of items 800 positioned in the box cavity 128. In various embodiments, the items 800 are positioned in the storage cavity 300 and occupy a second volume of the box cavity 128, which is less than the volume occupied by items 192. In various embodiments, the items 192 and items 800 may be various perishable items, pharmaceuticals, other temperature sensitive items, or other items to be shipped such as boxes of food, bottles of beverages, bagged fruits, bagged vegetables, and various other items. To minimize void space 704 in the storage cavity 300 between the items 192 and the top fold 182 of the second insulation liner 106, the top fold 182 is folded and the inner surface 178 of the second insulation liner 106 at the top fold 182 is positioned proximate to the items 800. In various embodiments, the top fold 182 is folded down over the storage cavity 300 by folding the top fold 182 along the third bend line 188. In various embodiments, when the top fold 182 is folded, the inner surface 178 of the second insulation liner 106 at the top fold 182 is positioned proximate to the items 800. The downward force applied to fold the top fold 182 may be applied by a human or a machine. In various embodiments, the inner surface 178 of the second insulation liner 106 at the top fold 182 contacts the items 800.

In various embodiments, this minimizes a distance from the items 800 to the inner surface 178 of the second insulation liner 106 at the top fold 182. As shown in FIG. 8, in various embodiments when the inner surface 178 of the second insulation liner 106 at the top fold 182 is positioned proximate to the items 800, the top side end 168 contacts the top side wall of the box 102, formed at least partially by flap 136. In various other embodiments, the top fold 182 is pushed downward until it contacts the items 800 without the top side end 168 contacting the top side wall of the box 102 or the inner surface 178 of the second insulation liner 106 contacting the inner surface 156 of the first insulation liner 104. In various embodiments, the top side end 168 of the top fold 182 is folded such that the top side end 168 bends upwards while the rest of the top fold 182 is pushed downward.

In various embodiments where the top fold 182 is pushed downward into the position shown in FIG. 8, the position of the top fold 182 with the top end 168 against the top side wall of the box 102 and the inner surface 156 of the first insulation liner 104 contacting the inner surface 178 of the second insulation liner 106 may hold the top fold 182 in position without any fillers or other securing mechanisms.

In various embodiments, at least a portion of the inner surface 178 of the second insulation liner 106 may contact at least a portion of the inner surface 156 of the first insulation liner 104. In various embodiments, the second insulation liner 106 may be folded at any desired location to minimize void space 704 in the storage cavity 300. In this manner, the adjustable insulation packaging assembly 100 may accommodate a variety of different items in the storage cavity 300 while minimizing void space 704.

In various embodiments, the positioning of the folded top fold 182 of the second insulation liner 106 is maintained by the top side end 168 contacting the top side wall of the box 102. In various other embodiments, the positioning of the folded top fold 182 is maintained through mechanisms including, but not limited to, folded flaps or tabs of the box 102 positioning the top fold 182 against the items 800, by pins attached to any of the side walls of the box 102 to position the top fold 182 against the items, by tabs bent out from any of the side walls of the box 102 or inserted into slots on any of the side walls of the box 102 to secure the top fold 182 against the items 800, by spacers, by scored flaps of the box 102, by void fill material such as bubble rolls, air pillows, packing foam, or other similar void fill material, or various other mechanisms suitable for positioning the top fold 182 against the items 800 and minimizing the void space 704. For example, in various embodiments, one or multiple of the flaps of the box 102, such as the top left flap 132 or top right flap 134, may be folded along a score line on the flaps 132,134 such that the flaps 132,134 are pressed down onto the top fold 182. In various embodiments, the flaps 132,134 may include multiple score lines to hold down the top fold 182 at different levels within the box 102 based on the volume of the storage cavity 300 occupied by items positioned in the box.

In various embodiments where the second insulation liner 106 is folded to minimize void space 704 in the storage cavity 300, box void space 802 may be formed between the second insulation liner 106, the first insulation liner 104, and the box 102. In various embodiments, the box void space 802 is formed between at least a portion of the outer surface 176 of the second insulation liner 106, at least a portion of the inner surface 156 of the first insulation liner 104, at least a portion of the back lateral side wall 114, and at least a portion of the top side wall of the box 102; however, the location and size of the box void space 802 should not be considered limiting on the current disclosure as the location of the box void space 802 may be between the first insulation liner 104, second insulation liner 106, and any of the sides of the box 102 in various other embodiments.

In various embodiments, the adjustable insulation packaging assembly 100 may include various fillers such as bubble rolls, air pillows, bubble wrap, packing papers, packing foam, packing peanuts, and various other fillers positioned in the box void space 802. In various embodiments, the fillers may be positioned between the insulation liners 104,106 and the flaps or side walls of the box 102. In various other embodiments, additional items to be shipped may be positioned in the box void space 802. In various embodiments, the void space 704 in the storage cavity 300 and the box void space 802 is minimized such that various items take up a substantial portion of the volume of the void spaces 704,802. In various embodiments where void spaces 704,802 in the box 102 are minimized, items within the box 102 may be more secured during shipment and thereby minimize the potential for damage and other forms of transit breakage. Minimized void spaces 704 may also improve insulation performance of the adjustable insulation packaging assembly 100. In various embodiments, minimizing or reducing the void spaces 704 may reduce the surface area of the first insulation liner 104 and second insulation liner 106 that surrounds the items in the storage cavity 300, such as items 192 or items 800. Heat transfer between the storage cavity 300 and the exterior environment may be a function of the surface area of the liners 104,106 and the thermal properties of the material from which the liners 104,106 are composed. In various embodiments, the insulation performance of the adjustable insulation packaging assembly 100 is improved when the items 192 or items 800 occupy less than a full potential volume of the storage cavity 300.

In various embodiments, the insulation properties of the first insulation liner 104, second insulation liner 106, and box 102 are utilized to achieve specific temperature profiles in to storage cavity 300.

A method of assembling the adjustable insulation packaging assembly 100 is also disclosed. It should be noted that any of the steps of any of the methods described herein may be performed in any order or could be performed in sub-steps that are done in any order or that are separated in time from each other by other steps or sub-steps, and the disclosure of a particular order of steps should not be considered limiting on the current disclosure. The box 102 having the box cavity 128 is provided.

The first insulation liner 104 is positioned in box cavity 128 of the box 102 such that the first insulation liner 104 contacts three of the lateral side walls of the box 102, such as the left lateral side wall 116, right lateral side wall 118, and front lateral side wall 112. The first insulation liner 104 includes the left fold 158, the center fold 160, and the right fold 162. The second insulation liner 106 is positioned in the box cavity 128 of the box 102 such that the second insulation liner 106 contacts the bottom side of the box 102 and one of the lateral side walls of the box 102, such as the back lateral side wall 114. The second insulation liner 106 includes the top fold 182, the back fold 184, and the bottom fold 186. In various embodiments, the second insulation liner 106 is positioned in the box cavity 128 such that the top fold 182 is positioned between the left fold 158 and the right fold 162 of the first insulation liner 104. In various embodiments, the inner surface 156 of the first insulation liner 104 contacts the bottom side end 170, the left side end 172, and the right side end 174 of the second insulation liner 106.

The first insulation liner 104 and second insulation liner 106 positioned in the box cavity 128 define the storage cavity 300. In various embodiments, the inner surface 156 of the first insulation liner 104 and the inner surface 178 of the second insulation liner 106 define the storage cavity 300. In various embodiments, items, such as items 192 or items 800, are positioned in the storage cavity 300. Void space 704 may exist between the items and the top fold 182 of the second insulation liner 106

In various embodiments, the top fold 182 is folded to minimize the void space 704 between the items in the storage cavity 300, such as items 800, and the second insulation liner 106. In various embodiments, the top fold 182 is folded by applying a downward force on the top fold 182 such that the inner surface 178 of the second insulation liner 106 at the top fold 182 is positioned proximate to the items 800. The downward force may be applied by a human or a machine. In various embodiments, the inner surface 178 of the second insulation liner 106 at the top fold 182 is folded such that the inner surface 178 contacts the items 800. In various other embodiments, the top fold 182 is pushed downward until it contacts the items 800 without the top side end 168 contacting the top side wall of the box 102 or the inner surface 178 of the second insulation liner 106 contacting the inner surface 156 of the first insulation liner 104. In various embodiments, the top side end 168 of the top fold 182 is folded such that the top side end 168 bends upwards while the rest of the top fold 182 is pushed downward.

In various embodiments, the top fold 182 is folded such that at least a portion of the outer surface 176 of the second insulation liner 106 contacts the top side wall of the box 102 when the flaps 132,134,136 are closed and the top side end 168 contacts the inner surface 156 of the first insulation liner 104. In various other embodiments, the top fold 182 is folded such that the top side end 168 contacts the top side wall of the box 102 when the flaps 132,134,136 are closed. In these embodiments, the box void space 802 may be defined between the second insulation liner 106 and the box 102. In various embodiments, a filler is positioned in the box void space 802 such that the contents of the box 102 occupy a volume of the box cavity 128 and the void spaces 704,802 are minimized.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. An insulation packaging assembly comprising:
a box defining a box cavity, the box defining a top end and a bottom end, the top end defining an opening to the box cavity, the box comprising a front lateral side wall, a back lateral side wall, a left lateral side wall, and a right lateral side wall each extending between the top end and the bottom end;
a first insulation liner positioned within the box cavity, the first insulation liner defining a C-shape, the first insulation liner comprising a first outer film and a first insulation material, the first insulation liner defining a first end and a second end, the first outer film comprising an outer portion defining an outer surface of the first insulation liner and an inner portion defining an inner surface of the first insulation liner, the outer surface facing the box, the inner surface at least partially defining a storage cavity, the first insulation material positioned between the outer portion and the inner portion, the first insulation material extending from the first end to the second end, the first insulation material being exposed at the first end and the second end, the first insulation liner defining a first side surface and a second side surface, the first side surface and the second side surface each extending between the inner surface and the outer surface and from the first end to the second end, the first insulation material being exposed along each of the first side surface and the second side surface, the first insulation material comprising a recycled cellulosic material, the first insulation liner comprising a first fold, a second fold, and a third fold, the third fold positioned between the first fold and the second fold, the first fold being parallel to the second fold, the third fold being substantially perpendicular to each of the first fold and the second fold; and
a second insulation liner positioned within the box cavity, the second insulation liner defining the C-shape, the second insulation liner fitting together with the first insulation liner to further define the storage cavity, the second insulation liner comprising a second outer film and a second insulation material, the second outer film defining an outer surface and an inner surface of the second insulation liner, the second insulation liner defining a third end and a fourth end, the second insulation material being exposed at the third end and the fourth end, the second insulation liner defining a third side surface and a fourth side surface, the third side surface and the fourth side surface each extending between the inner surface and the outer surface of the second insulation liner and from the third end to the fourth end, the second insulation material being exposed along each of the third side surface and the fourth side surface, the second insulation liner being positioned between the first fold and the second fold with the second insulation material positioned in contact with the first fold along the third side surface and the second insulation material positioned in contact with the second fold along the fourth side surface.

2. The insulation packaging assembly of claim 1, wherein the recycled cellulosic material comprises recycled cotton.

3. The insulation packaging assembly of claim 2, wherein the first outer film comprises polymer.

4. The insulation packaging assembly of claim 1, wherein at least one of the first outer film and the first insulation material comprises an unwoven material.

5. The insulation packaging assembly of claim 1, wherein the storage cavity defines a volume, and wherein the volume is adjustable to minimize void space within the storage cavity.

6. The insulation packaging assembly of claim 5, wherein the second insulation liner is configured to fold to reduce the volume of the storage cavity.

7. The insulation packaging assembly of claim 1, wherein:
the second insulation liner defines a fourth fold, a fifth fold, and a sixth fold; and
the fourth fold and the fifth fold are bent substantially perpendicular to the sixth fold to define the C-shape of the second insulation liner.

8. The insulation packaging assembly of claim 1, wherein the first insulation material defines an insulation thickness, and wherein the insulation thickness is constant from the first end to the second end.

9. The insulation packaging assembly of claim 1, wherein:
the second insulation liner comprises a fourth fold, a fifth fold, and a sixth fold;
the sixth fold covers the back lateral side wall; and
the fourth fold covers the bottom end.

10. An insulation liner comprising:
an outer film defining an inner surface and an outer surface of the insulation liner, the outer film extending continuously from a first end of the insulation liner to a second end of the insulation liner; and
an insulation material coupled to the outer film, the insulation material extending continuously from the first end to the second end, the insulation material positioned between the inner surface and the outer surface, the insulation material exposed along a first side surface, a second side surface, a first end surface, and a second end surface of the insulation liner, the first end surface defined at the first end, the second end surface defined at the second end, the first side surface extending from the first end to the second end between the inner surface and the outer surface, the second side surface extending from the first end to the second end between the inner surface and the outer surface; and
wherein:
the outer film and the insulation material together define a first fold, a second fold, and a third fold of the insulation liner;
the first fold defines the first end;
the second fold defines the second end;
the third fold is positioned between the first fold and the second fold;
the insulation liner is configured to fold to a C-shaped configuration;
the first fold is parallel to the second fold in the C-shaped configuration;
the third fold is substantially perpendicular to the first fold and the second fold in the C-shaped configuration; and
the insulation material comprises recycled cellulosic material.

11. The insulation liner of claim 10, wherein:
the outer film comprises an outer portion and an inner portion;
the outer portion defines the outer surface;
the inner portion defines the inner surface; and
the insulation material is positioned between the outer portion and the inner portion.

12. The insulation liner of claim 10, wherein the recycled cellulosic material is recycled cotton.

13. The insulation liner of claim 10, wherein the outer film comprises a polymer.

14. The insulation liner of claim 13, wherein the polymer is polyethylene.

15. The insulation liner of claim 10, wherein at least one of the outer film and the insulation material comprises a nonwoven material.

16. The insulation liner of claim 10, wherein:
the first fold is a left fold;
the second fold is a right fold; and
the third fold is a center fold.

17. The insulation liner of claim 10, wherein:
the first fold is a top fold;
the second fold is a back fold; and
the third fold is a bottom fold.

18. The insulation liner of claim 10, wherein the insulation liner defines a thickness between the inner surface and the outer surface, and wherein the thickness is constant from the first end to the second end.

* * * * *